United States Patent [19]

Boone

[11] Patent Number: 4,593,671

[45] Date of Patent: Jun. 10, 1986

[54] SUPPLEMENTAL CARBURETION DEVICE

[76] Inventor: Richard K. Boone, 3811 Elldedge Dr., Shawnee Mission, Kans. 66201

[21] Appl. No.: 704,581

[22] Filed: Feb. 22, 1985

[51] Int. Cl.$^4$ ............................................ F02B 25/06
[52] U.S. Cl. .................................... 123/572; 123/525; 123/590
[58] Field of Search ............... 123/572, 573, 574, 525, 123/585, 587, 590, 557, 41.86

[56] References Cited

U.S. PATENT DOCUMENTS

| | | | |
|---|---|---|---|
| 1,244,953 | 1/1930 | Dienner | 123/581 |
| 1,758,897 | 5/1930 | Evans | 123/575 |
| 2,070,009 | 2/1937 | Goodman | 123/437 |
| 3,809,035 | 5/1974 | Winton | 123/574 |
| 3,923,024 | 12/1975 | Dabrio | 123/573 |
| 4,132,247 | 1/1979 | Lindberg | 123/574 |
| 4,175,525 | 11/1979 | Johnson | 123/572 |
| 4,183,336 | 1/1980 | Norman | 123/572 |
| 4,203,411 | 5/1980 | Vieille-Mecet | 123/582 |
| 4,204,504 | 5/1980 | Dabrio | 123/573 |
| 4,220,127 | 9/1980 | Reynolds | 123/573 |
| 4,305,369 | 12/1981 | Norman | 123/572 |
| 4,338,905 | 7/1982 | Urich | 123/525 |
| 4,342,287 | 8/1982 | Concepcion | 123/572 |
| 4,369,754 | 1/1983 | Lofman | 123/572 |
| 4,401,095 | 8/1983 | DuLoft | 123/590 |

Primary Examiner—Magdalen Y. C. Moy
Attorney, Agent, or Firm—Wallenstein, Wagner, Hattis, Strampel & Aubel

[57] ABSTRACT

A unique supplemental carburetion device for internal combustion engines producing a primary source of fuel-air mixture for use at idle and low engine speeds resulting in decreased fuel consumption and exhaust emissions comprising a fuel reservoir chamber joined to a source of liquid fuel and determinate fluid communication with a fuel metering chamber. The metering chamber preferably is vented to ambient air pressure contains diaphragm valve means for controlling fluid flow into the metering chamber. Liquid fuel from the metering chamber flows into a nebulizing chamber and is nebulized by interaction with a stream of ambient air or blow-by gases. The fuel-air stream is passed into a venturi throat and vaporized and then passed into an expansion chamber where the stream is expanded under low static gas pressure to a mixture having a pre-determined fuel to air ratio. The mixture exits the device and is delivered into downstream portions of the carburetor throat.

15 Claims, 4 Drawing Figures

SUPPLEMENTAL CARBURETION DEVICE

DESCRIPTION

1. Technical Field

The present invention generally relates to supplemental fuel-air control devices for vehicular internal combustion engines, and, in particular, to a supplemental carburetion device providing a primary source of fuel-air mixture at idle and low engine speeds.

2. BACKGROUND OF THE INVENTION

When an internal combustion engine runs at idle or low engine speeds, the throttle valve of the engine carburetion system is in a generally closed position thereby preventing ambient air from being drawn into the throat of the carburetor. As is well known in the art, the narrowed carburetor throat functions as an induction pipe and in accordance with the Bernoulli effect a vacuum is created in the throat. The vacuum causes liquid fuel to be drawn from the main or high speed fuel jets of the carburetor. With the throttle valve generally closed, the vacuum in the throat around the main fuel jets is essentially diminished. As a result, fuel ceases to be drawn from the main fuel jets and into the carburetor.

Under these conditions the low speed and idle fuel pilot system becomes operable so that fuel is now drawn from a fuel jet downstream from the closed throttle valve. Because the throttle valve is not completely closed when the engine is idling and only slightly open at low engine speeds, ambient air is permitted to pass through a narrow gap formed between one edge of the throttle valve and the inner carburetor wall. Ambient air passes through this narrow gap at a high velocity developing a substantial vacuum downstream of the closed throttle valve to draw fuel from the low speed fuel jet.

The substantial vacuum formed in downstream portions of the carburetor throat behind the throttle valve and in the engine intake manifold results in a very rich fuel-air mixture. The richness of the mixture is caused by the substantially decreased volume of ambient air being drawn into the carburetor because of throttle valve closure. The rich fuel-air mixture inducted into the cylinder heads at idling and low engine speeds causes unsatisfactory engine performance, increased fuel consumption and exhaust emissions because of incomplete combustion of the rich fuel-air mixture. It has been observed that while idling, most internal combustion engines consume far more fuel, about 1.2–1.5 gallons/hour, than is consumed at vehicle speeds of 30 mph or greater. At higher vehicle and engine speeds fuel-air mixtures become leaner and more consistently mixed. The leaner mixtures coupled with higher operating temperatures result in more complete combustion. Unfortunately, most vehicular internal combustion engines in urban driving conditions operate at low engine speeds resulting in the above discussed problems but also causing increased engine wear and fouling of fuel ignition parts. In short, to improve overall fuel consumption, fuel combustion efficiency and to reduce exhaust emissions of a vehicular internal combustion engines, leaner and more consistently mixed fuel-air mixtures must be developed at idling and low engine speeds.

The prior art has addressed this problem by a variety of devices which generally introduce ambient air into the intake manifold, usually through a portion of the crankcase conduit, as a means of diluting the rich fuel-air mixture developed during idling and low engine speeds. Examples of these devices are disclosed in U.S. Pat. Nos. 3,809,035, 3,923,024, 4,183,336, 4,305,369 and 4,483,309. However, in each of these devices, the low speed fuel system of the carburetor continues to be employed as the sole source of fuel-air mixture. Further, these devices merely reduce the vacuum in the carburetor throat and intake manifold by venting ambient air into the carburetion induction system or in the case of U.S. Pat. No. 4,369,754 injecting an alcohol-water mixture into the crankcase ventilation conduit.

In recent years, crankcase ventilation conduits have been required on vehicular internal combustion engines which return blow-by gases from the crankcase to the carburetor induction system, usually through the intake manifold or a downstream portion of the carburetor. Closed crankcase ventilation became required by pollution control laws and prohibited use of draft tubes to exhaust crankcase blow-by gases directly into the atmosphere. However, in order to control engine carburetion it was found necessary to control the flow of blow-by gases from the crankcase into the intake manifold. To control blow-by gas flow, a Positive Crankcase Ventilation valves (PCV valve) is interposed in the crankcase ventilation conduit.

During engine idling, the PCV valve is generally closed but for a small opening either on the valve plate or a narrow gap formed between the valve plate and PCV valve housing. At idle and low engine speeds, the PCV valve is slightly open allowing a limited return of blow-by gases and at high speeds is completely open permitting a complete return of blow-by gases for reburning. Closure of the PCV valve during idling and low engine speeds restricts passage of blow-by gases into the intake manifold to avoid further enrichment of the already rich fuel-air mixture. Because of the closure of the PCV valve, the vacuum in the carburetor throat and intake manifold remains high which merely encourages continued development of rich fuel-air mixtures. Further, closure of the PCV valve at idle and low engine speeds precludes any use of blow-by gases as a basis for a leaner fuel-air mixture and permits the deleterious build-up of blow-by gases within the crankcase.

No known prior art devices utilize the blow-by gases as a basis of a more suitable fuelair mixture during engine idling and low engine speeds. The prior art has suggested auxiliary or supplemental carburetion devices, e.g. U.S. Pat. Nos. 1,744,953; 1,758,897; 2,070,009; 4,203,411; 4,191,153. However, none of these prior art devices suggest essentially by-passing the low speed fuel pilot system and delivering downstream of the closed throttle valve, a precisely mixed, leaner fuel-air mixture during idle and low engine speed operation while also relieving the high vacuum present in downstream portions of the carburetor throat and intake manifold caused by closure of the throttle valve and PCV valve.

Prior to the present invention, a need existed for a supplemental carburetion device which would develop a primary and constant source of fuelair mixture at idling and low engine speeds essentially by-passing the idle and low speed fuel pilot system. Further, a need existed for a supplemental carburetion device for idling and low engine speeds which would develop a leaner fuel-air mixture and reduce fuel consumption and exhaust emissions. Also, a need existed for a supplemental carburetion device which could be used to develop a leaner fuel-air mixture for idling and low engine speeds by utilizing blow-by gases as a basis of such mixture to result in more complete fuel combustion.

SUMMARY OF THE INVENTION

According to the present invention, a supplemental carburetion device has been developed which produces the primary source of a lean, fuel-air mixture for idling or low engine speeds introduced into the crankcase ventilation conduit. Because the supplemental carburetion device of the present invention functions as the primary engine carburetor at idling and low engine speeds, the idle and low speed fuel delivery system of the carburetor essentially can be eliminated. Through use of the device of the present invention, fuel consumption is dramatically decreased at idling and low engine speeds thereby increasing overall fuel efficiency through all engine speeds. Further, the supplemental carburetion of the present invention produces an optimal and leaner fuel-air mixture than produced by the low speed fuel delivery system resulting in more complete fuel combustion and reducing exhaust emissions. Finally, the supplemental carburetion device of the present invention may be installed to utilize crankcase blow-by gases as a basis of an idle and low engine speed fuel mixture. Through using such blow-by gases the overall efficiency of the engine is increased.

Generally, the present invention is comprised of four basic chambers, a fuel reservoir chamber, a fuel metering chamber, a fuel nebulizing chamber and a fuel expansion chamber. The fuel reservoir chamber is in selective fluid communication at one end with a liquid fuel source. An other end of the fuel reservoir chamber is in selective fluid communication with the metering chamber. The metering chamber is vented to the ambient atmosphere and contains an air pressure responsive diaphragm valve controlling admission of liquid fuel from the fuel reservoir chamber into the metering chamber. One face of the diaphragm valve is directed to the ambient atmosphere vent and an other face is directed to the metering chamber cavity. The nebulizing chamber is in direct fluid communication with the metering chamber. One end of the nebulizing chamber is in gas communication with either a source of filtered ambient air or blow-by gases from the crankcase. An other end of the nebulizing chamber opens into a narrower end of a venturi throat, the wider end thereof being joined to the fuel expansion chamber. The volumetric capacity of the expansion chamber is selectively proportionate to the nebilizing chamber to result in an optimal fuel to air ratio. An other end of the expansion chamber forms the outlet of the present invention and is in gas communication with a portion of the crankcase conduit between the PCV valve and either the intake manifold or a portion of the carburetor throat downstream of the throttle valve.

The supplemental carburetion device of the present invention functions in the following manner. Vacuum present in the crankcase ventilation conduit lowers the static gas pressure within the expansion chamber thereby developing a vacuum. The vacuum is further intensified in accordance with the Bernoulli effect through the narrower end of the venturi throat and the nebulizing chamber. The presence of vacuum in the expansion and nebulizing chambers causes ambient air or blow-by gas (depending upon installation of the present invention) to be drawn into the one end of the nebulizing chamber. The vacuum present in the nebulizing chamber likewise causes a vacuum to be created in the metering chamber. The pressure differential between the greater ambient air pressure on the one face of the diaphragm valve and vacuum on the other face of the diaphragm valve causes the valve to flex and actuate a needle valve to permit liquid fuel to flow from the reservoir chamber into the metering chamber. The fuel in the metering chamber next passes into the nebulizing chamber and is nebulized by a sheering action caused by ambient air or blow-by gas entering into the one end of the nebulizing chamber. The nebulized fuel enters the venturi throat and eventually the main cavity of the expansion chamber to expand and further disassociate into a selected fuel-gas mixture. The fuel-gas mixture is drawn into the crankcase ventilation conduit and delivered either to the intake manifold or a downstream portion of the carburetor throat.

Because the supplemental carburetion device of the present invention functions as the primary source of fuel-gas mixture during idle and low engine speed operation the engine should be detuned so that the low speed fuel delivery system of the carburetor comes essentially eliminated. As will later be illustrated in greater detail, road tests conducted on vehicles on which the present invention is installed reveal a marked decrease in fuel consumption and reduction in emission of unburned hydrocarbons.

The present invention may be best understood with reference to the following detailed description and in connection with the accompanying drawings and in particular, to the novel inventive characteristics described in the appended claims.

DETAILED DESCRIPTION

Figure 1:
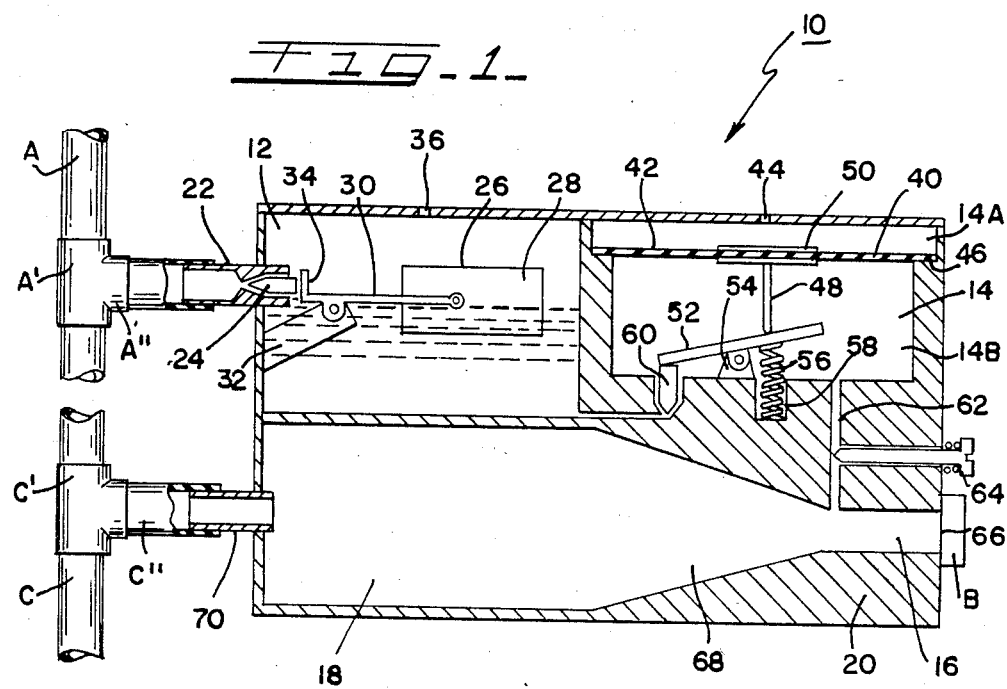
FIG. 1 is a vertical section of a preferred embodiment of the present invention in a non-operative state.
Figure 2:
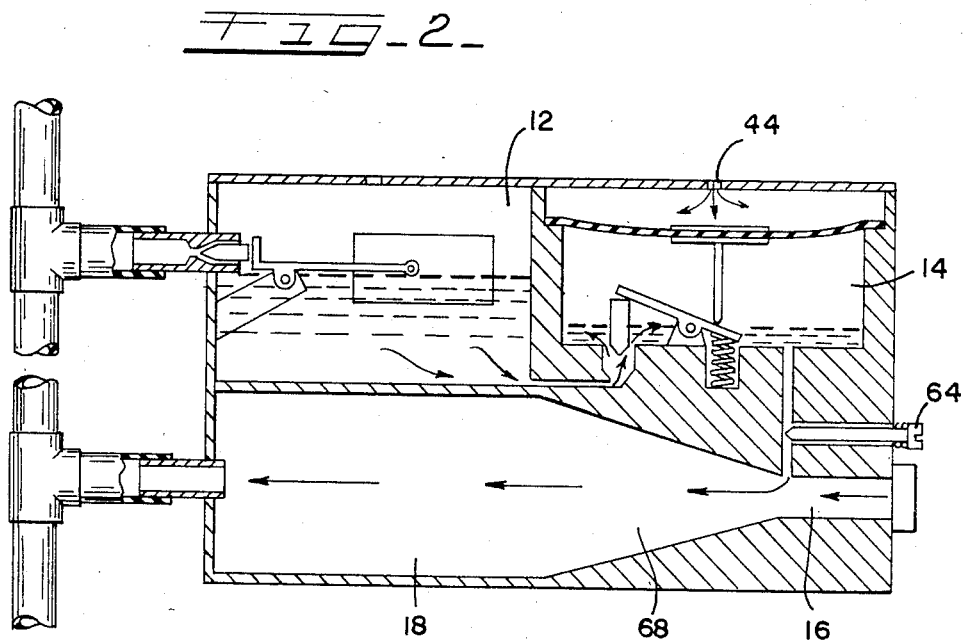
FIG. 2 is the same sectional view of FIG. 1 disclosing the operation mode of the preferred diaphragm valve.
Figure 3:
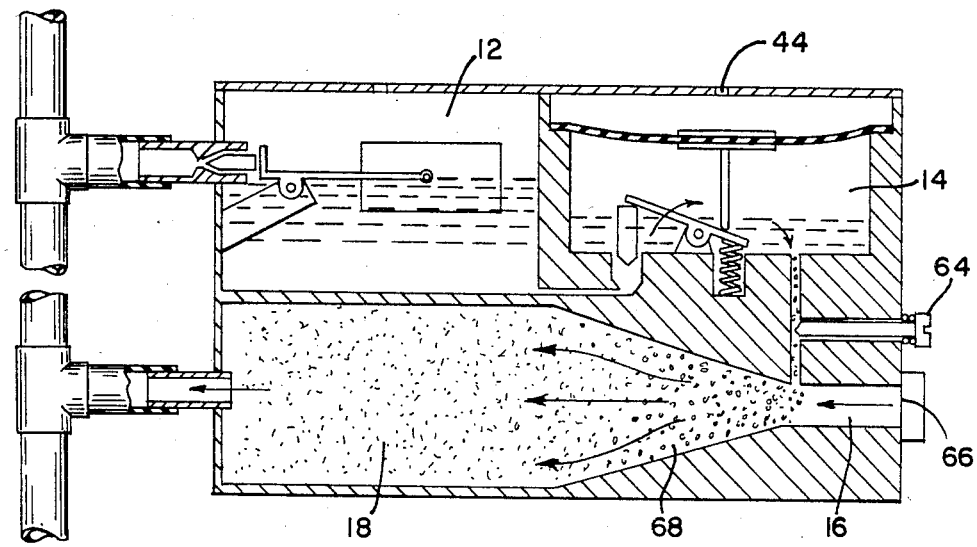
FIG. 3 is the same sectional view of FIG. 1 disclosing fuel being nebulized and expanded in the nebulizing and expansion chambers; and, FIG. 4 is a flow chart disclosing the installation and production of an optimal fuel-air mixture for idling and low engine speeds utilizing the present invention.

Referring now to the drawings, FIG. 1 discloses a preferred embodiment of the supplemental carburetion device of the present invention generally referenced by 10. Carburetion device 10 is generally comprised of four chambers, a fuel reservoir chamber 12, a fuel metering chamber 14, a fuel nebulizing chamber 16 and an expansion chamber 18. Each of chambers 12, 14, 16 and 18 preferably may be contained within a common housing 20 as disclosed in FIG. 1 may be contained with independent housings. For example, reservoir chamber 12 and metering chamber 14 may be contained within a common housing and in fluid communication with nebulizing chamber 16 and expansion chamber 18 which may also be contained within a housing independent of chambers 12 and 14. Chambers 12, 14, 16 and 18 as well as housing 20 may be manufactured from any alloy known in the art used in the manufacture of carburetors which is durable and thermally conductive. By being made from a thermally conductive alloy, carburetion device 10 will become warmer with increased operating tempertures resulting in more complete vaporization of the fuel-gas mixture.

Fuel reservoir chamber 12 functions as a holding cavity for fuel to be fed to metering chamber 14 during operation of carburetor device 10. Reservoir chamber 12 is in fluid communication with a liquid fuel source, either directly from the fuel pump or the fuel bowl of the carburetor. Preferably, reservoir chamber 12 is joined to fuel line A through use of a tee member A' interposed in fuel line A. A short portion of flexible fuel line tubing A" inserted within tee member A' joins a fuel line connector 22 with fuel line A. Connector 22 forms a fuel inlet of device 10. A needle valve 24 is seated within connector 22 for control of fluid flow into reservoir chamber 12.

For proper metering of fuel in chamber 14, a constant quantity of fuel should be maintained within reservoir chamber 12 through use of a fuel level regulating valve, such as a float valve 26 as disclosed in FIG. 1. Float valve 26 is comprised of a buoyant float 28 made of a substance non-degradable in gasoline and other fuels. Float 28 is pivotally joined to a control arm 30 pivotally mounted to a support bracket 32 extending from an inner wall of chamber 12. A stop plate 34 at one end of control arm 30 translates the buoyant positioning of float 28 on the fuel surface by limiting the unseating of needle valve 24 within fuel connector 22. Because of the liquid pressure within fuel line A, needle valve 24 is urged to unseat and in the absence of stop plate 34 would blow-out of its seating.

When chamber 12 is in an empty or partially filled condition, float 28 hangs downward in chamber 12 so that stop plate 34 is angled away from connector 22 permitting needle valve 24 to become partially unseated. As a result of partial unseating of needle valve 24, liquid fuel flows into chamber 12. Fuel continues to flow until the surface level rises to such an extent to cause float 28 to lift arm 32 rocking stop plate 34 against needle valve 24 to re-seat valve 24 thereby terminating flow of fuel into chamber 16. The liquid contents of chamber 12 is maintained under ambient air pressure through vent 36.

Reservoir chamber 12 is in fluid communication with metering chamber 14 through a channel 38. Important to the operation of carburetor device 10 is the proper metering and delivery of fuel from chamber 14 to nebulizing chamber 16. The primary regulation of fuel delivered from chamber 14 to nebulizing chamber 16 is accomplished through use of a gas pressure responsive valve such as a diaphragm valve 40 seated within metering chamber 14 as disclosed in FIG. 1. Diaphragm valve 40 is preferably comprised of a flexible diaphragm 42 having a peripheral edge configuration corresponding to the configuration of an upper portion 14*a* of chamber 14. Upper chamber portion 14*a* is maintained at ambient air pressure through a vent 44. However, lower portion 14*b* of chamber 14 is maintained at the gas pressure present in chambers 16 and 18. Diaphragm 42 is a resilient substance which is non-degradeable in gasoline and other petroleum products, such as neoprene rubber. Diaphragm 42 is seated and supported at its peripheral edges in upper portion 14*a* by a valve seat 46. One face of diaphragm 42 is directed toward vent 44 in upper portion 14*a*. One portion of diaphragm 42 is disposed toward lower portion 14*b*.

Centrally joined to diaphragm 42 is a post 48 mounted to diaphragm 42 through plates 50 as disclosed in FIG. 2. Post 48 on its free end is counterbalanced by one side of a lever 52. Lever 52 is pivotally mounted to a fulcrum 54 with the one side of lever 52 being urged upward by spring 56 seated within well 58. Through action of spring 56, lever 52 urges post 48 to maintain diaphragm 42 in a non-flex position. An underside of an other end of lever 52 controls a needle valve 60 which determines fluid flow from chamber 12 to metering chamber 14. Despite the fluid pressure in channel 38, valve 60 remains seated and restrained by lever 52.

Diaphragm valve 40 becomes operative when the differential of gas pressure in lower chamber portion 14*b* and ambient air pressure in 14*a* reaches a selected value causing diaphragm 42 to flex downward moving post 48 to depress the one end of lever 52 and to compress spring 56. This operation is best disclosed in FIG. 2 illustrating pivoting of lever 52 on fulcrum 54 permitting partial unseating of needle valve 60 to admit fuel into lower portion of 14*b* of metering chamber 14. In order for diaphragm valve 40 to operate and properly meter liquid fuel to nebulizing chamber 16, helical spring 56 must be selected having a compressive force in responsive to the vacuum generated in expansion chamber 18 and nebulizing chamber 16.

Metering chamber 14 is in fluid communication with nebulizing chamber 14 through a feed line 62. Because of tolerance in compressive pressures for spring 56 and flexibility variances of diaphragm 42, feed line 62 is provided with a secondary regulating means, such as a spring loaded regulating screw 64. A tip of regulating screw 64 partially penetrates feed line 62 blocking-off a portion of feed line 62 thereby regulating fluid flow into nebulizing chamber 16. With regulating screw 64 open providing no blockage of feed line 62, it has been found that the proper quantity of fluid delivered to nebulizing chamber 16 from metering chamber 14 can be achieved through a feed line 62 having a diameter about 1/60th of the diameter of nebulizing chamber 16.

One end of nebulizing chamber 16 is joined to a gas source conduit B which may be either filtered ambient air or blow-by gases taken from the crankcase ventilation conduit. As best disclosed in FIG. 3, liquid fuel drawn from feed line 62 enters nebulizing chamber 16 and is sheered into small liquid particles by interaction with the ambient air or hot blow-by gases entering the nebulizing chamber 16 at a gas inlet 66. When blow-by gases are utilized as a gas source, regulating screw 64 should be adjusted to provide partial blockage of feed line 62. This is necessary since the blow-by gases passing through the PCV valve contain uncombusted hydrocarbons so that fuel delivered to the nebulizing chamber 16 from chamber 14 can be decreased.

Nebulizing chamber 16 is joined to the expansion chamber 18 through a venturi throat 68. Nebulized fuel from chamber 16 passes into venturi throat 65 and becomes further mixed with air or blow-by gases. Further, in accordance with the Bernoulli effect, as the nebulized fuel-air stream approaches the widened portions of throat 68, the dynamic gas pressure of the mixture decreases while the static gas pressure increases and levels off upon reaching chamber 18. Because of the increase in static gas pressure, the nebulized fuel particles disassociate until the fuel becomes fully vaporized and mixed with the gas source derived through gas inlet 66. It has been found that static gas pressure within expansion chamber 18 under normal operating conditions of carburetor device 10 varies between 5 to 18 in/Hg. The volumetric ratio of expansion chamber 18 to nebulizing chamber 16 is about 16 to 1 which results in a gaseous expansion of fuel from nebulizing chamber 16 to expansion chamber 18 of about 108,000 times.

The fuel-gas mixture generated in expansion chamber 18 approaches the highly desirable ratio of 15 parts air per 1 part fuel. The fuel-air mixture exits expansion chamber 18 and carburetion device 10 through outlet 70. The mixture contained in outlet 70 is delivered to the crankcase ventilation conduit C by means of an interconnection with a tee-member C' and a short conduit portion C''. The portion of the crankcase ventilation conduit C is located downstream of the PCV valve so that the fuel-gas mixture created by carburetion device 10 bypasses the PVC valve and is delivered directly to intake manifold or to a specially developed port located in a downstream portion of the carburetor throat as disclosed in FIG. 4.

Figure 4:
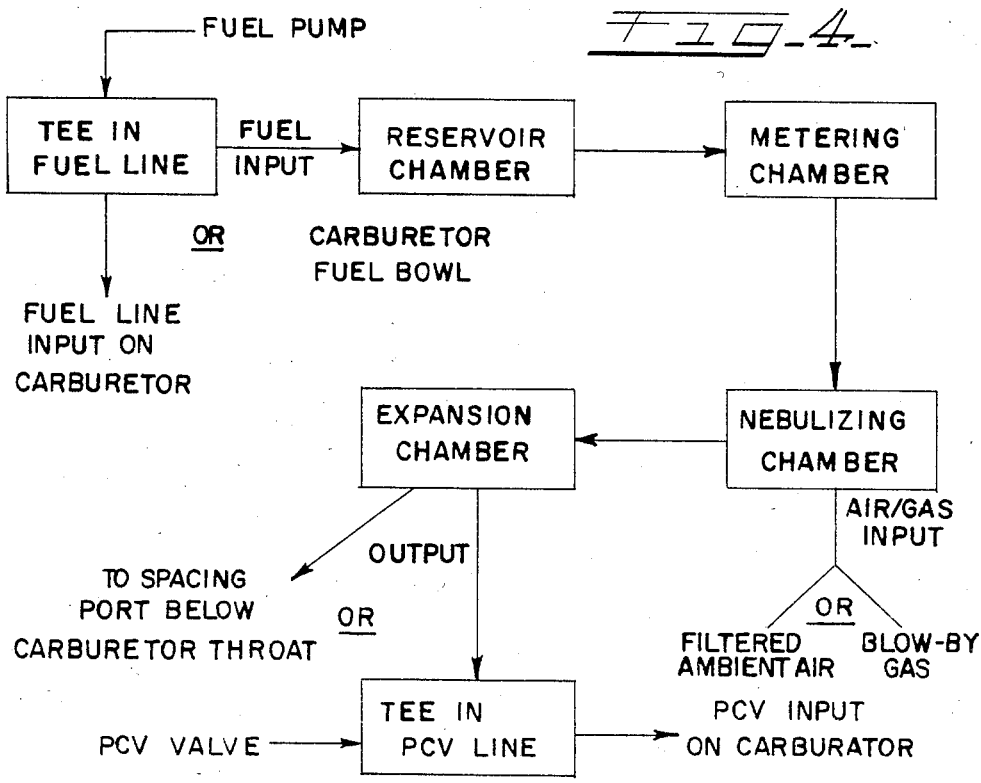

FIG. 4 discloses in diagrammatic fashion the operation and function of the supplemental carburetion device 10. As previously discussed, the fuel input to device 10 may be drawn either from the fuel line or directly from the carburetor fuel bowl. Further, the air-gas input into nebulizing chamber 16 may be derived either from filtered ambient air or blow-by gases drawn from the crankcase ventilation conduit downstream from the PCV valve. The fuel-air mixture produced by device 10 is delivered either back into the crankcase ventilation conduit, again downstream of the PCV valve or is introduced directly into a specially made spacing port in a downstream segment of the carburetor throat.

The preferred installation mode of the present invention is through use of a blow-by gas source emanating from the crankcase ventilation conduit. This installation mode is preferred because fuel consumption is decreased even further through use of the uncombusted hydrocarbons in the blow-by gases. As previously discussed, in this installation mode, regulating screw 64 should be adjusted to lessen fuel flow into chamber 16. After installation of carburetion device 10, the idle and low speed fuel system should be determined so that idle speed set screw should by unscrewed to a full out position and the idle and low speed fuel jet set screws should be screwed inward until the engine begins faltering. At this point, the fuel jet screw should be unscrewed ½ turn. Through this detuning method, the idle and low speed carburetion system is essentially inactivated but for a modicum of some secondary fuel-air mixture.

The supplemental carburetion device 10 of the present invention was roaded tested on automobiles having considerable vehicular mileage and engine wear. The two automobiles were tested in three driving environments namely, city driving, highway driving and average city driving. City driving for purposes of the present road test was conducted with the vehicle achieving a speed of 30 mph with intermittent vehicle starts and stops.

For purposes of the present road test, highway driving is defined as a continuous vehicle speed of 50 mph without interruption while the average city driving environment is defined as a compilation of short destination, trips with the vehicle engine being started and stopped intermittently between destinations. To determine fuel consumption, the engine of each vehicle was temperture stabilized, depending upon the ambient weather conditions. After temperture stabilization, the vehicle was brought up to test speed, speed set, and an on-board computer was activated to evaluated fuel consumption taking into account such variables as altitude, temperature, humidity and vehicle fuel capacity. For the present road tests, the gas source utilized and drawn into inlet 66 was filtered ambient air.

EXAMPLE I

Vehicle Description: 1976 Ford Monarch
Engine Description: 6 cylinder, 250 cubic inch displacement;
Odometer Reading: 118,346
Engine Condition: Worn engine bearings, excessive oil consumption

| Vehicle Speed: | Test Results | | | |
|---|---|---|---|---|
| | Idle | ave. city driving | 30 mph | 50 mph |
| | (gal/hr.) | | | |
| without device | 1.2 | 2.2 | 1.79 | 2.69 |
| with device | .45 | 1.34 | .85 | 1.12 |
| | (miles/gal) | | | |
| without device | — | 13.6 | 16.8 | 18.2 |
| with device | — | 22.4 | 35.2 | 44.6 |

EXAMPLE II

Vehicle Description: 1972 Lincoln Mark IV
Engine Description: 8 cylinder, 460 cubic inch displacement
Odometer Reading: 89,396
Engine Condition: Excessive oil consumption

| Vehicle Speed: | Test Results | | | |
|---|---|---|---|---|
| | Idle | ave. city driving | 30 mph | 50 mph |
| | (gal/hr.) | | | |
| without device: | 1.4 | 6.79 | 4.44 | 5.34 |
| with device: | .5 | 1.9 | 1.65 | 2.02 |
| | (miles/gal) | | | |
| without device | — | 4.42 | 6.78 | 9.36 |
| with device | — | 15.8 | 18.2 | 24.7 |

From the above test results, fuel comsumption at idle decreased to about 0.4 to 0.5 gallons per hour and the number of miles per gallon for both vehicles tested remained essentially the same at a 30 mph vehicle speed and at a 50 mph vehicle speed. Generally, a 40 to 60 percent mileage increase was realized for each vehicle tested although it should be understood that fuel comsumption and number of miles attained per gallon will vary depending on the type of carburetor employed for a given vehicle engine.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope therof. Therefore, it is intended that the invention not be limited to a particular embodiment disclosed as the best mode contemplated for carrying out the invention, but that the invention will include all embodiments falling within the scope of the appended claims.

I claim:

1. An apparatus for carburetion of an internal combustion engine operating at idle and low engine speeds, the apparatus being in gaseous communication with a crankcase ventilation conduit of the engine comprising in combination:

a fuel reservoir chamber, the reservoir chamber being in fluid communication with a liquid fuel source;

a fuel metering chamber, the metering chamber being in determinate fluid communication with the reservoir chamber, the metering chamber being vented to ambient air pressure;

gas pressure responsive valve means for the determinate fluid communication of the metering chamber with the reservoir chamber, the valve means controlling the volume of liquid fuel in the metering chamber;

a nebulizing chamber, the nebulizing chamber being in fluid communication with the metering chamber and with a gas source; and, an expansion chamber, the expansion chamber at one end joined to the nebulizing chamber and at an other end in gaseous communication with a portion of the crankcase ventilation conduit;

whereby vacuum from the conduit lowers gas pressure in the expansion chamber, nebulizing chamber and metering chamber, the lower gas pressure causing the valve means to admit fuel into the metering chamber from the reservoir chamber, the fuel in the metering chamber being drawn into the nebulizing chamber and nebulized by interaction with gas from the gas source, the nebulized fuel expanding to a vapor within the expansion chamber, the resulting fuel-gas mixture being exhausted into the conduit as a primary source of fuel-gas mixture for idling and low engine speeds.

2. The apparatus of claim 1 wherein the gas source may include blow-by gas drawn from a crankcase of the engine.

3. The apparatus of claim 1 wherein the gas source may include filtered ambient air.

4. The apparatus of claim 1 wherein the liquid fuel source may include fuel drawn directly from a fuel pump of the engine.

5. The apparatus of claim 1 wherein the liquid fuel source may include fuel drawn from a fuel bowl of an engine carburetor.

6. The apparatus of claim 1 wherein the gas pressure responsive valve means is carried within the metering chamber.

7. The apparatus of claim 6 wherein the gas pressure responsive valve means comprises:

a flexible diaphragm, the diaphragm seating in an upper portion of the metering chamber, one face of the diaphragm being directed to the vent of the metering chamber;

a post for transmitting flexing of the diaphragm, one end of the post centrally and perpendicularly joined to an other face of the diaphragm, an other end of the post being free; and, a lever, one end of the lever controlling needle valve means between the reservoir chamber and the metering chamber, an other end of the lever being urged against the free end of the post by a bias element.

8. The apparatus of claim 7 wherein the metering chamber includes;

a dimensionally larger upper portion and a dimensionally smaller lower portion, a shoulder being formed where the upper portion and the lower portion interface, the shoulder defining a seat for supporting the peripheral edges of the diaphragm.

9. The apparatus of claim 1 wherein venturi throat for expansion of the fuel-gas mixture is interposed between the nebulizing chamber and the expansion chamber, the nebulizing chamber opening into a narrow end of a throat, the expansion chamber opening into a wide end of the throat.

10. The apparatus of claim 1 where a fuel feed passage places the metering chamber in fluid communication with the nebulizing chamber.

11. The apparatus of claim 10 wherein a regulating set screw is interposed along the fuel feed passage to control fuel flow through the passage.

12. A method of producing a primary fuel-gas mixture for supplemental carburetion at idle and low engine speeds in internal combustion engines having vacuum-drawn carburetors and crankcase ventilation conduits comprising the steps of:

(a) generating a gaseous-fluid stream comprised of blow-by gases and liquid fuel droplets through passing a source of blow-by gases by a liquid fuel outlet to nebulize the liquid fuel into the blow-by gases;

(b) vaporizing the generated stream by passing the generated stream through a venturi means having an increasing volumetric capacity to further blend the blow-by gases and liquid fuel droplets;

(c) expanding the generated stream to a mixture having a pre-determined gas-liquid ratio by drawing the stream into a chamber having a volumetric capacity greater than the venturi means and subjecting the generated stream to a lower static gas pressure; and, (d) delivering the mixture to the engine.

13. The method of claim 12 wherein the step of delivering the mixture to the engine further includes;

passing the mixture into a portion of the crankcase ventilation conduit; and, introducing the mixture within the conduit into a downstream throat portion of the engine carburetor.

14. An apparatus for carburetion of an internal combustion engine operating at idle and low engine speeds, the apparatus being in gaseous communication with a crankcase ventilation conduit of the engine comprising in combination:

a fuel reservoir chamber, the reservoir chamber being joined to a liquid fuel source;

a fuel metering chamber, the metering chamber being in determinate fluid communication with the reservoir chamber through a passage, the metering chamber being vented to ambient air pressure, an upper portion of the metering chamber having a dimension greater than a lower portion of the metering chamber;

gas pressure responsive valve means for controlling the flow of liquid fuel through the passage, the valve means being within the metering chamber;

a nebulizing chamber, the nebulizing chamber being in fluid communication with the metering chamber and with a gas source;

an expansion chamber joined to the nebulizing chamber at one end, the expansion chamber in gaseous communication at an other end with a portion of the crankcase ventilation conduit between a positive crankcase ventilation valve and an air-fuel intake on the engine; and, venturi means interposed between the nebulizing chamber and the expansion chamber, a narrow end of the venturi means opening into the nebulizing chamber and a wider end of the venturi chamber opening into the expansion chamber.

15. The apparatus of claim 14 wherein the volumetric ratio of the expansion chamber to the nebulizing chamber is 16:1.

* * * * *